US012615381B2

(12) United States Patent
Zhao et al.

(10) Patent No.: US 12,615,381 B2
(45) Date of Patent: Apr. 28, 2026

(54) CROSS COMPONENT SAMPLE CLIPPING

(71) Applicant: Tencent America LLC, Palo Alto, CA (US)

(72) Inventors: Xin Zhao, Palo Alto, CA (US); Guichun Li, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 184 days.

(21) Appl. No.: 18/214,296

(22) Filed: Jun. 26, 2023

(65) Prior Publication Data

US 2024/0080463 A1 Mar. 7, 2024

Related U.S. Application Data

(60) Provisional application No. 63/403,631, filed on Sep. 2, 2022.

(51) Int. Cl.

| | |
|---|---|
| *H04N 19/186* | (2014.01) |
| *H04N 19/117* | (2014.01) |
| *H04N 19/132* | (2014.01) |
| *H04N 19/172* | (2014.01) |
| *H04N 19/177* | (2014.01) |
| *H04N 19/182* | (2014.01) |
| *H04N 19/70* | (2014.01) |
| *H04N 19/82* | (2014.01) |
| *H04N 19/85* | (2014.01) |

(52) U.S. Cl.
CPC ......... *H04N 19/186* (2014.11); *H04N 19/117* (2014.11); *H04N 19/132* (2014.11);
(Continued)

(58) Field of Classification Search
None
See application file for complete search history.

(56) References Cited

U.S. PATENT DOCUMENTS 7,760,808 B2 7/2010 Luo et al.
2013/0294689 A1 11/2013 Jia et al.
(Continued)

FOREIGN PATENT DOCUMENTS

WO WO-2021150085 A1 * 7/2021 ........... H04N 19/184

OTHER PUBLICATIONS

Bordes et al. EE7 Adaptive Clipping syntax, Joint Video Exploration Team (JVET) of ITU-T SG 16 WP 3 and ISO/IEC JTC 1/SC 29/WG 11, 4th meeting, Chengdu, C N, Oct. 15-21, 2016 (Year: 2016).*

(Continued)

*Primary Examiner* — Tsion B Owens
*Assistant Examiner* — Shanika M Brumfield
(74) *Attorney, Agent, or Firm* — Morgan, Lewis & Bockius LLP

(57) ABSTRACT

The various implementations described herein include methods and systems for coding video. In one aspect, a method includes receiving video data including a current image frame having a sample with a first color component and a second color component. The method further includes obtaining a first clipping range for pixel values of the first color component in the sample based on a syntax element value in the received video data and deriving a second clipping range for pixel values of the second color component in the sample based on the first clipping range. The method further includes in response to a pixel value of the second color component exceeding the second clipping range, restricting the pixel value to a minimum value or a maximum value corresponding to the second clipping range. The method further includes reconstructing the current non-monochrome image frame using the restricted pixel value for the sample.

20 Claims, 8 Drawing Sheets

Receive video data including a current non-monochrome image frame with two or more color components. ⌐702

The current non-monochrome image frame includes a sample with a first color component and a second color component, wherein the second color component is different from the first color component. ⌐704

Obtain a first clipping range for pixel values of the first color component in the sample based on a syntax element value in the received video data. ⌐706

Derive a second clipping range for pixel values of the second color component in the sample based on the first clipping range for pixel values of the first color component. ⌐708

In response to a pixel value of the second color component exceeding the second clipping range, restrict the pixel value to a minimum value or a maximum value corresponding to the second clipping range. ⌐710

Reconstruct the current non-monochrome image frame using the restricted pixel value for the sample. ⌐712

(52) U.S. Cl.
CPC ......... *H04N 19/172* (2014.11); *H04N 19/177* (2014.11); *H04N 19/182* (2014.11); *H04N 19/70* (2014.11); *H04N 19/82* (2014.11); *H04N 19/85* (2014.11)

(56) References Cited

U.S. PATENT DOCUMENTS

| | | | |
|---|---|---|---|
| 2016/0227224 | A1 | 8/2016 | Hsieh et al. |
| 2016/0309059 | A1* | 10/2016 | Tourapis ............... H04N 19/85 |
| 2017/0339423 | A1 | 11/2017 | Chen et al. |
| 2019/0082184 | A1 | 3/2019 | Hannuksela |
| 2019/0082186 | A1 | 3/2019 | Van Der Vleuten |
| 2020/0374518 | A1* | 11/2020 | Hu ........................ H04N 19/117 |
| 2021/0160507 | A1* | 5/2021 | Kim ........................ H04N 19/96 |
| 2021/0281876 | A1* | 9/2021 | Zhang .................. H04N 19/117 |
| 2021/0297680 | A1 | 9/2021 | Wang et al. |
| 2022/0210446 | A1 | 6/2022 | Auyeung et al. |
| 2024/0048733 | A1* | 2/2024 | Zhao .................... H04N 19/184 |

OTHER PUBLICATIONS

Tencent Technology, ISRWO, PCT/US2023/026457, Sep. 19, 2023, 14 pgs.

* cited by examiner

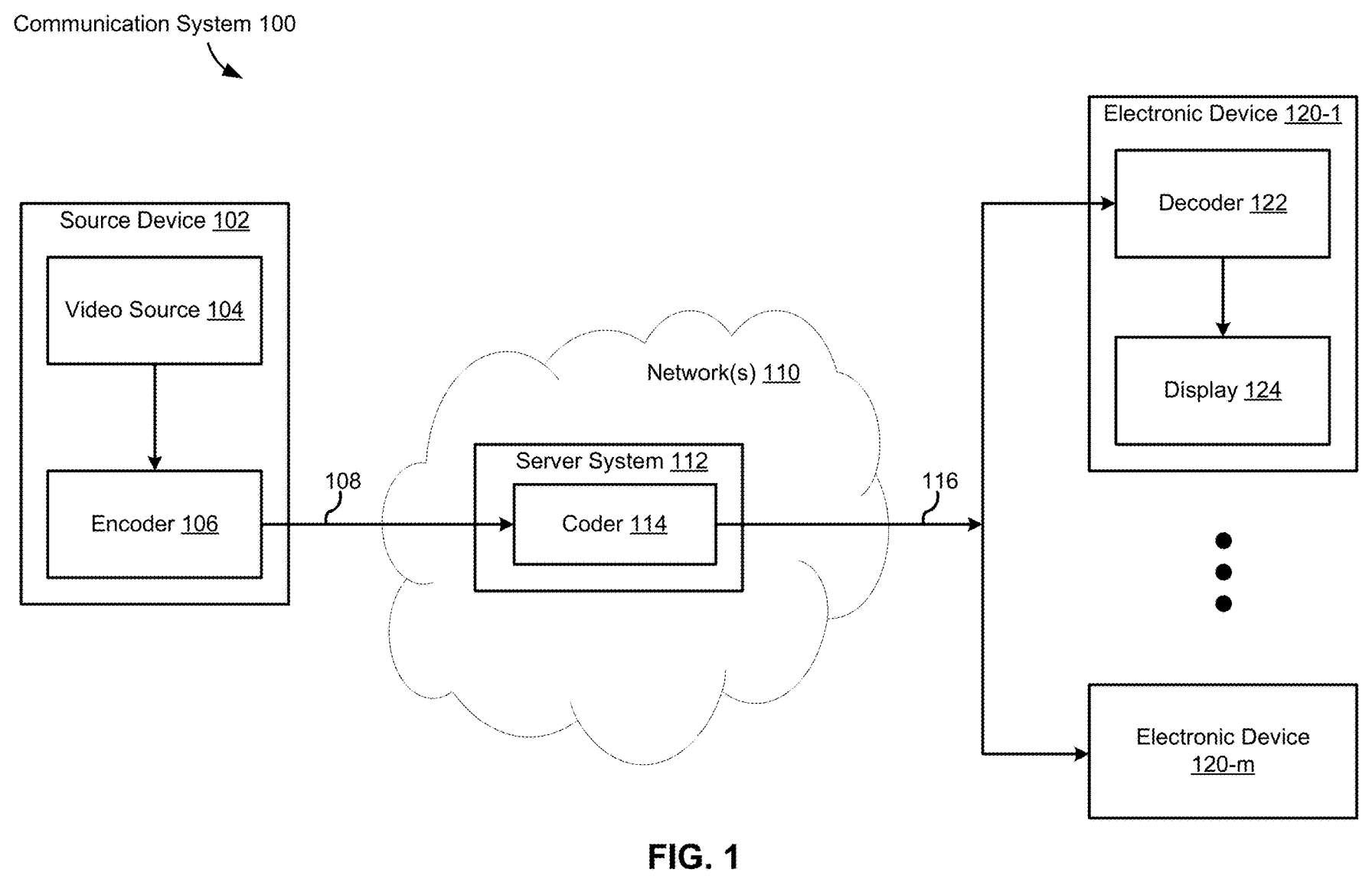

Communication System 100

Electronic Device 120-1

Decoder 122

Display 124

Electronic Device 120-m

116

Network(s) 110

Server System 112

Coder 114

108

Source Device 102

Video Source 104

Encoder 106

FIG. 1

Server System
112

Memory 314

| Operating System 316 |
| Network Communication Module 318 |
| Coding Module 320 |

Decoding Module 322

Parsing Module 324

Transform Module 326

Prediction Module 328

Filter Module 330

Encoding Module 340

Code Module 342

Prediction Module 344

Picture Memory 352

Control Circuitry 302

Network Interface(s) 304

312

User Interface 306

Output Device(s) 308

Input Device(s) 310

FIG. 4

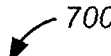
700

702
Receive video data including a current non-monochrome image frame with two or more color components.

704
The current non-monochrome image frame includes a sample with a first color component and a second color component, wherein the second color component is different from the first color component.

706
Obtain a first clipping range for pixel values of the first color component in the sample based on a syntax element value in the received video data.

708
Derive a second clipping range for pixel values of the second color component in the sample based on the first clipping range for pixel values of the first color component.

710
In response to a pixel value of the second color component exceeding the second clipping range, restrict the pixel value to a minimum value or a maximum value corresponding to the second clipping range.

712
Reconstruct the current non-monochrome image frame using the restricted pixel value for the sample.

FIG. 7

CROSS COMPONENT SAMPLE CLIPPING

RELATED APPLICATIONS

This application claims priority to U.S. Provisional Patent Application No. 63/403,631, entitled "Cross Component Sample Clipping," filed Sep. 2, 2022, which is hereby incorporated by reference in its entirety.

TECHNICAL FIELD

The disclosed embodiments relate generally to video coding, including but not limited to systems and methods for controlling clipping of color components of an image frame jointly during video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/ H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/ decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes controlling clipping of color components of an image frame jointly during video coding. Pixel values of a color image are adaptively clipped in different pixel value ranges corresponding to different color components of the color image. For example, each sample is represented with three color components (e.g., red, green, and blue (RGB) color components, luminance and chroma (YCbCr) components). Pixel values of each color component have a respective clipping range within which the pixel values of the respective color component are controlled. In some implementations, two color components of the same color image are co-located and correlated with each other. For example, a first color component and a second color component correspond to the same one or more pixels of the color image. For an image frame or a coding block of an image frame, a first clipping range for pixel values of the first color component is associated with a second clipping range for pixel values of the second color component. In accordance with a pixel value of the first color component is identified within the first clipping range, a pixel value of the corresponding second color component is identified within the second clipping range. Conversely, in accordance with the pixel value of the second color component is identified within the second clipping range, the pixel value of the corresponding first color component is identified within the first clipping range. One of the two clipping ranges is recovered at least partially based on the other of the two clipping ranges. By these means, information one of the two clipping ranges does not need to be, or only needs to be partially, encoded and transmitted in a video bitstream, thereby reducing the amount of video data to be encoded and enhancing efficiency of video data transmission.

In accordance with some embodiments, a method of video decoding is provided. The method includes receiving video data including a current non-monochrome image frame with two or more color components. The current non-monochrome image frame includes a sample with a first color component and a second color component, and the second color component is different from the first color component. The method further includes obtaining a first clipping range for pixel values of the first color component in the sample based on a syntax element value in the received video data and deriving a second clipping range for pixel values of the second color component in the sample based on the first clipping range for pixel values of the first color component. The method further includes in response to a pixel value of the second color component exceeding the second clipping range, restricting the pixel value to a minimum value or a maximum value corresponding to the second clipping range. The method further includes reconstructing the current non-monochrome image frame using the restricted pixel value for the sample.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 4 illustrates an example process of clipping pixel values of two color components of a current coding block of a current image frame, in accordance with some embodiments.

FIG. 7 is a flow diagram of a method of coding video, in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
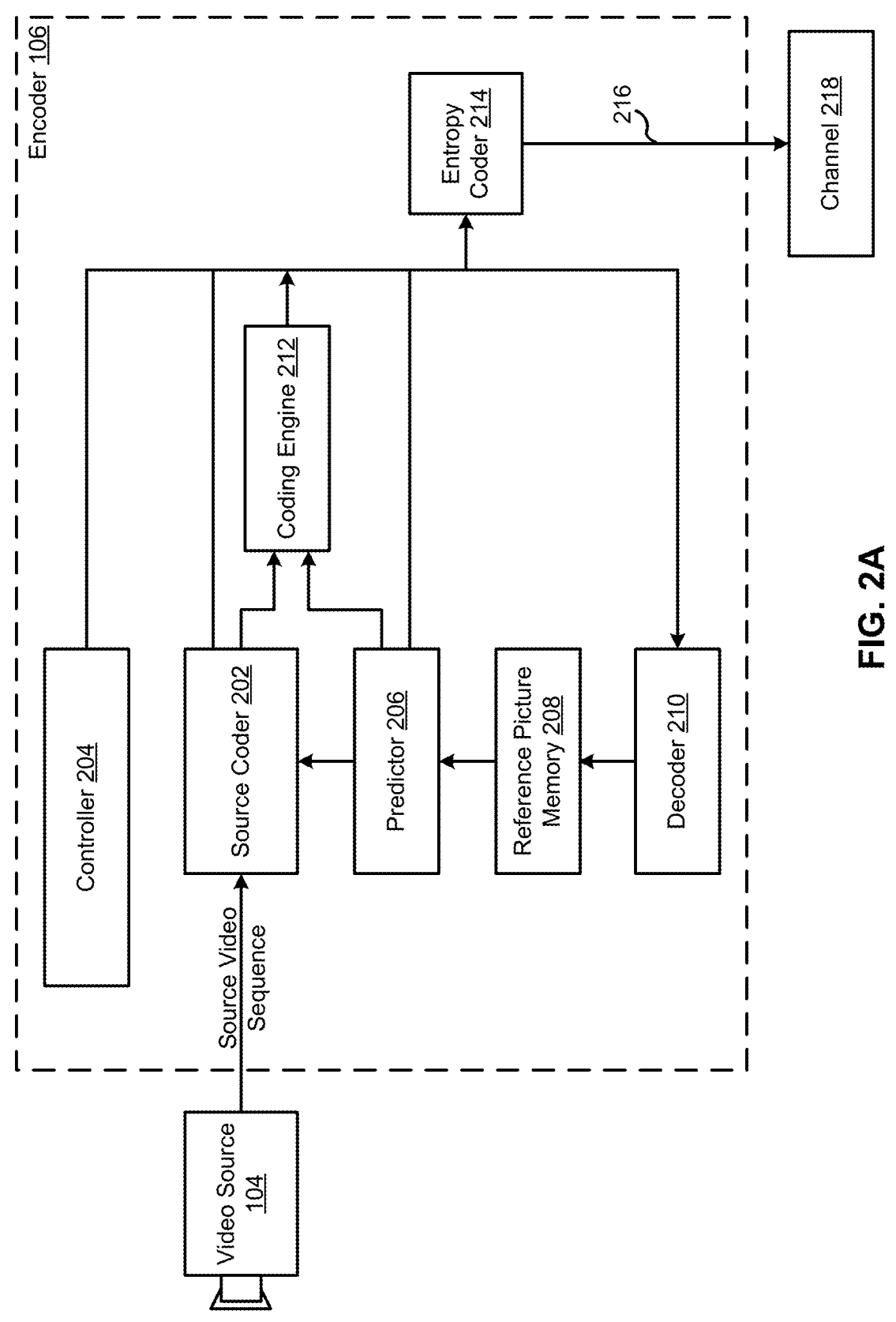
FIG. 2A is a block diagram illustrating example elements of an encoder component in accordance with some embodiments.

The present disclosure describes controlling clipping of different color components of an image jointly during video coding. Samples of a color image are adaptively clipped in different pixel value ranges corresponding to different color components of the color image. Each color component has a respective clipping range within which corresponding samples of the respective color component are controlled. In some implementations, two color components of the same color image are co-located and correlated with each other. Specifically, for an image frame or a coding block of an image frame, a first clipping range for pixel values of a first color component is uniquely associated with a second clipping range for pixel values of a second color component co-located with the first color component. In accordance with a pixel value of the first color component is identified within the first clipping range, the pixel value of the corresponding second color component is identified within the second clipping range. Conversely, in accordance with a pixel value of the second color component is identified within the second clipping range, the pixel value of the corresponding first color component is identified within the first clipping range. One of the two clipping ranges is recovered at least partially based on the other of the two clipping ranges. By these means, one of the two clipping ranges does not need to be, or only needs to be partially, encoded and transmitted in a video bitstream, thereby reducing the amount of video data to be encoded and enhancing efficiency of video data transmission.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100** is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
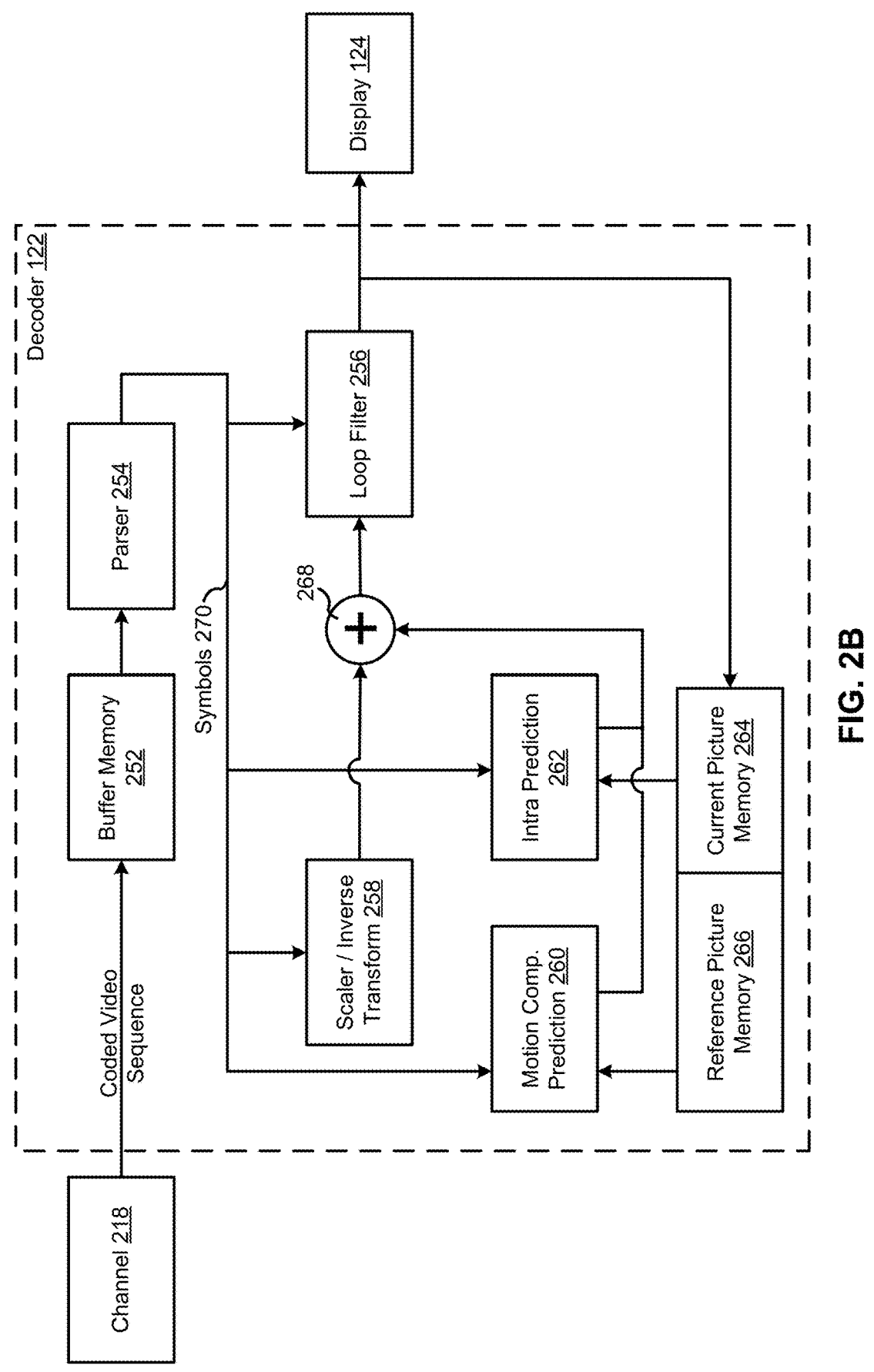
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
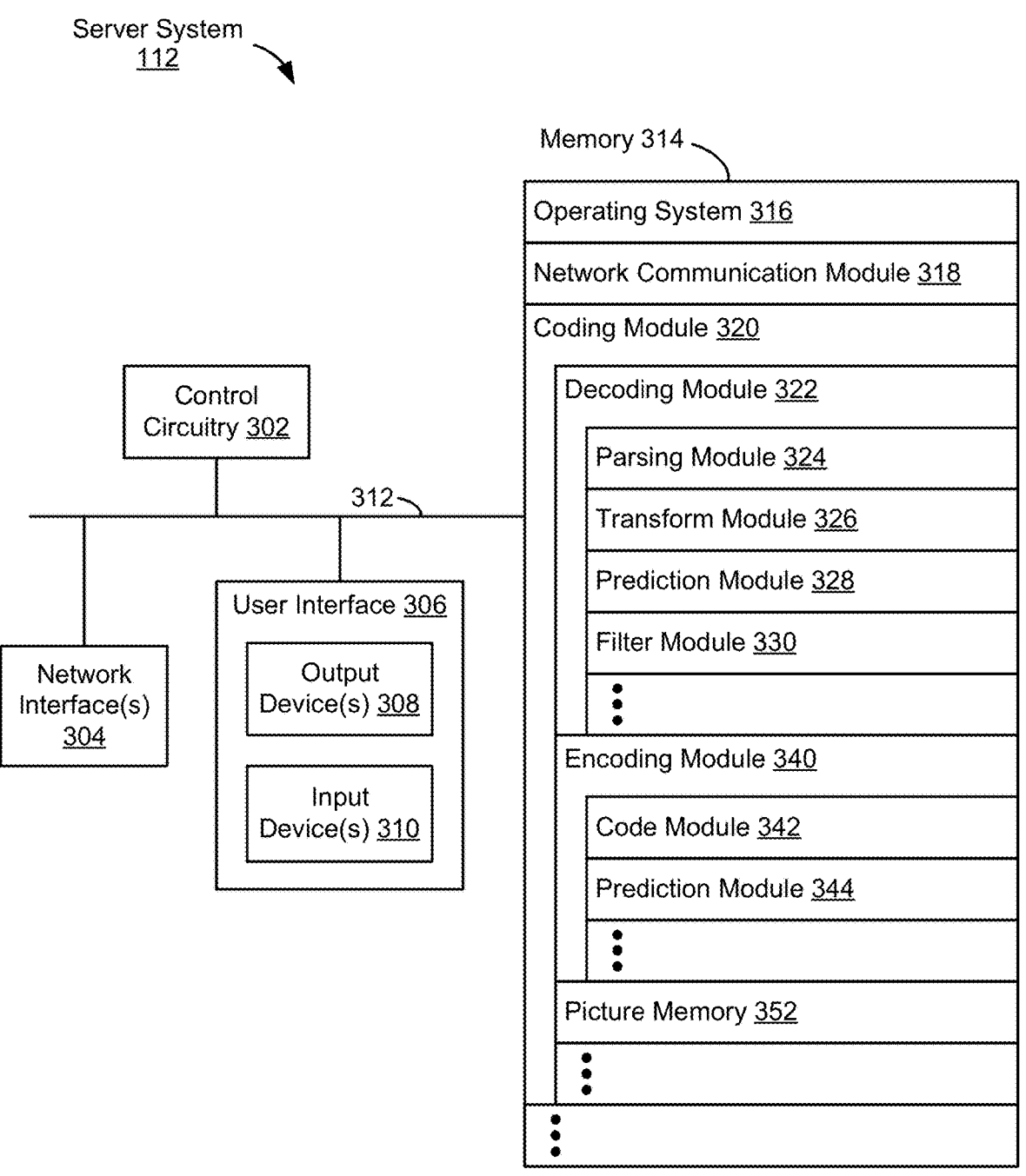
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
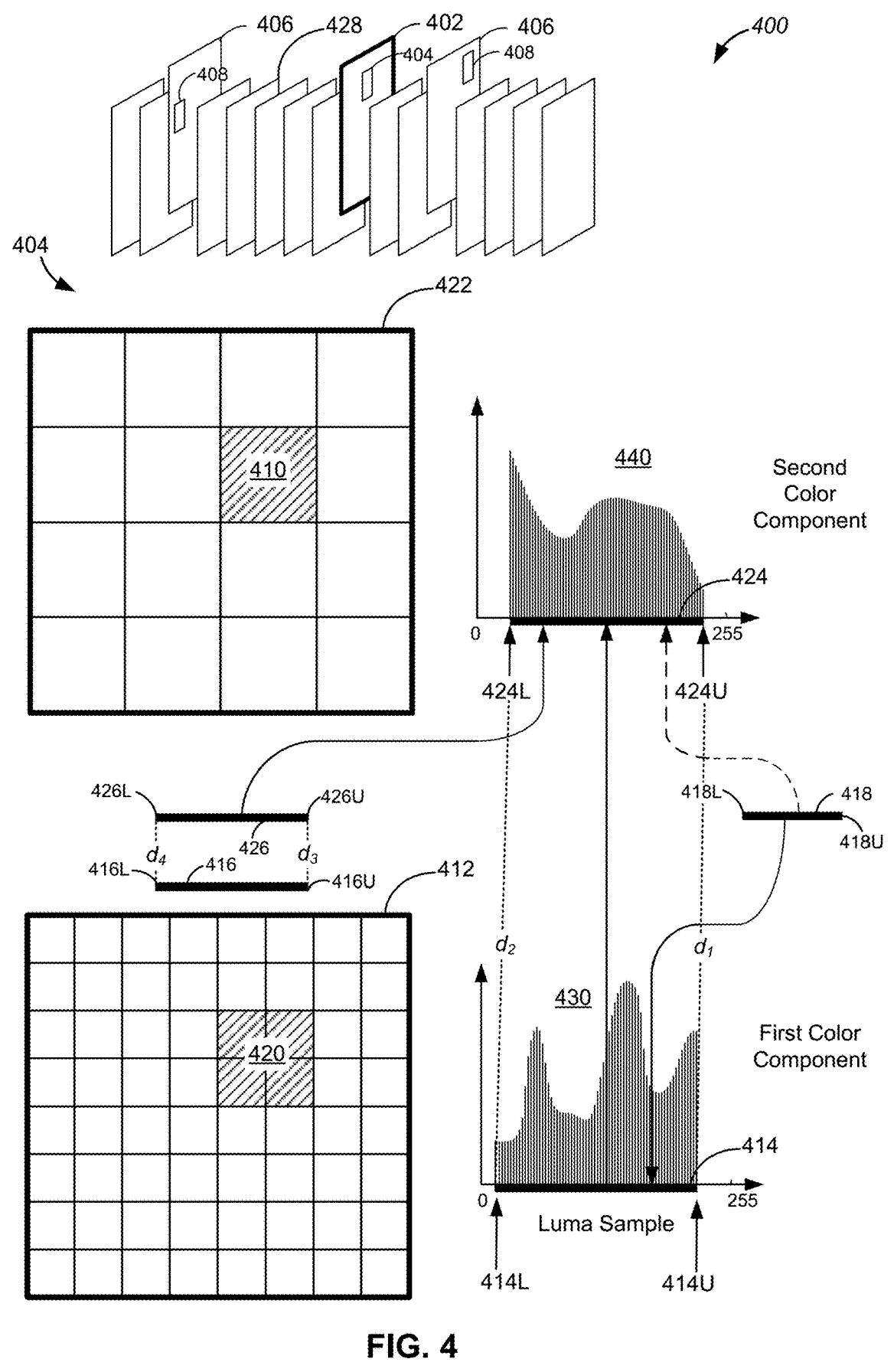

FIG. 4 illustrates an example process 400 of clipping pixel values of two color components of a current coding block 404 of a current image frame 402, in accordance with some embodiments. A GOP includes a sequence of image frames. The sequence of image frames includes the current image frame 402 that further includes the current coding block 404. The current image frame 402 includes a color image, i.e., a non-monochrome image frame. The current coding block 404 is encoded based on prediction data of one or more coding blocks 408 of one or more reference images 406 in the GOP. In some embodiments, bilateral matching is applied to encode the current coding block 404. For example, the current coding block 404 is encoded based on prediction data of two reference prediction blocks 408 of two reference frames 406 in the GOP. In some embodiments, adaptive sample clipping is applied in JCTVC-O0146 and JVET-O0040, and for samples of each color component (e.g., luma and chroma samples), a respective clipping range is determined and applied by the decoder 122 during clipping operations that follow prediction, reconstruction, deblocking, and/or adaptive loop filtering in video encoding and decoding. Specifically, in some embodiments, the decoder 122 obtains video data of a current image frame 402 including a sample 410 with a first color component 412 (e.g., blue color component) and a second color component 422 (e.g., red color component). The first color component 412 is distinct from the second color component 422. A first clipping range 414 is determined for pixel values of the first color component 412, and used to determine a second clipping range 424 for pixel values of the second color component 422. The decoder 122 reconstructs the current image frame 402, including clipping the pixel values of the second color component 422 according to the second clipping range 424. For ease of reference, each of the color components 412 and 422 of the current image frame 402 is represented by a respective color plot 430 or 440 illustrating a relationship of a time of occurrence of each pixel value and a pixel value of a respective color component (e.g., in a range of 0-255).

In some embodiments, the second clipping range 424 is defined by a second upper limit 424U and a second lower limit 424L. The first clipping range 414 is defined by a first upper limit 414U differing from the second upper limit 424U by a first deviation $d_1$ and a first lower limit 414L differing from the second lower limit 424L by a second deviation $d_2$. Further, in some embodiments, the first clipping range 414, the first deviation $d_1$, and the second deviation $d_2$ are transmitted from the encoder 106 to the decoder 122. The decoder 122 determines the second clipping range 424 by determining the second upper limit 424U based on the first upper limit 414U and the first deviation $d_1$ and determining the second lower limit 424L based on the first lower limit 414L and the second deviation $d_1$. For example, the second upper limit 424U is a sum of the first upper limit 414U and the first deviation $d_1$, and the second lower limit 424L is a sum of the first lower limit 414L and the second deviation $d_2$. Additionally, in some embodiments, each of the first deviation $d_1$ and the second deviation $d_2$ is represented and signaled in a quantized form of 2 to a power of a respective integer number. In an example, the first deviation $d_1$ is signaled in a quantized form of 2 to a power of 2 (e.g., in a quantized form of 4), and $d_1$ is approximated to and signaled as 0, 4, 8, 12, 16, and the like.

In some embodiments, the current image frame 402 follows a prior image 428 in the GOP. The prior image 428 includes a prior sample with the first color component 412 and the second color component 422. The first color component 412 of the prior sample corresponds to a third clipping range 416 defined by a third upper limit 416U and a third lower limit 416L, and the second color component 422 of the prior sample corresponds to a fourth clipping range 426 defined by a fourth upper limit 426U differing from the third upper limit 416U by a third deviation $d_3$ and a fourth lower limit 426L differing from the third lower limit 416L by a fourth deviation $d_4$. The encoder 126 determines the first deviation $d_1$ between the first and second upper limits 414U and 424U based on the third deviation $d_3$ of the prior image 428, and the second deviation $d_2$ between the first and second lower limits 414L and 424L based on the fourth deviation $d_4$.

In some embodiments, the second color component 422 and the first color component 412 correspond to the same current coding block 404 of the current image frame 402. The second color component 422 and the first color component 412 are co-located with each other. The first color component 412 corresponding to the sample 410 is co-located with the second color component 422 corresponding to the sample 410 in the current image frame 402. For example, the first color component 412 include a luma component, and the second color component 422 includes a chroma component (e.g., Cb, Cr) that is co-located with the luma component. In some embodiments, the encoder 126 downsamples the one or more pixel values 420 of the first color component 412 corresponding to the sample 410 to generate a downsampled second sample. The second clipping range 424 of the sample 410 is determined based on the second clipping range of the downsampled second sample.

In some embodiments, the data of the current image frame 402 transmitted from the encoder 106 to the decoder 122 includes information of the first clipping range 414 (e.g., the limits 414U and 414L) of the first color component 412 in a high level syntax associated with the current image frame 402. The high level syntax corresponds to a data level above a block level, and is embedded in one of a group consisting of video parameter set (VPS), sequence parameter set (SPS), picture parameter set (PPS), adaptation parameter set (AP), slice header, picture header, tile header, coding tree unit (CTU) header. Stated another way, the information of the first clipping range 414 (e.g., the limits 414U and 414L) of the first color component 412 is optionally coded on a coding block level, an image slice level, an image tile level, an image frame level, or a higher level. In some embodiments, the current image frame 402 includes an image region that further includes one or more coding blocks, one or more image slices, one or more image tiles, an entire image, or a combination thereof. The sample 410 of the second color component 422 and the first color component 412 is located in the image region. The second clipping range 424 applies to the image region of the current image frame 402.

In some embodiments, the decoder 122 determines whether a luma mapping with chroma scaling (LMCS) filter is applied. In accordance with a determination that the LMCS filter is applied, the decoder 122 determines the second clipping range 424 based on a bit depth of video coding. In some embodiments, the decoder 122 determines that an LMCS filter is not applied. The first clipping range 414 is determined based on a predefined clipping range 418. The first clipping range 414 is defined by a first upper limit 414U differing from a predefined upper limit 418U by an upper deviation $d_U$ and a first lower limit 414L differing from a predefined lower limit 418L by a lower deviation $d_D$. The decoder 122 obtains the upper deviation $d_U$ and the lower deviation $d_D$ in the video data of the current image frame 402. The first clipping range 414 is further determined based on the upper deviation $d_U$ and the lower deviation $d_D$. In some embodiments, each of the upper deviation $d_U$ and the lower deviation $d_D$ is represented and signaled in a quantized form of 2 to a power of a respective integer number. In some embodiments, the second clipping range 424 is defined by a second upper limit 424U differing from the predefined upper limit 418U by a fifth deviation and a second lower limit 424L differing from the predefined lower limit 418L by a sixth deviation. The decoder 122 obtains the fifth deviation and the sixth deviation and determines the second clipping range 424 based on the fifth and sixth deviations.

Figure 5:
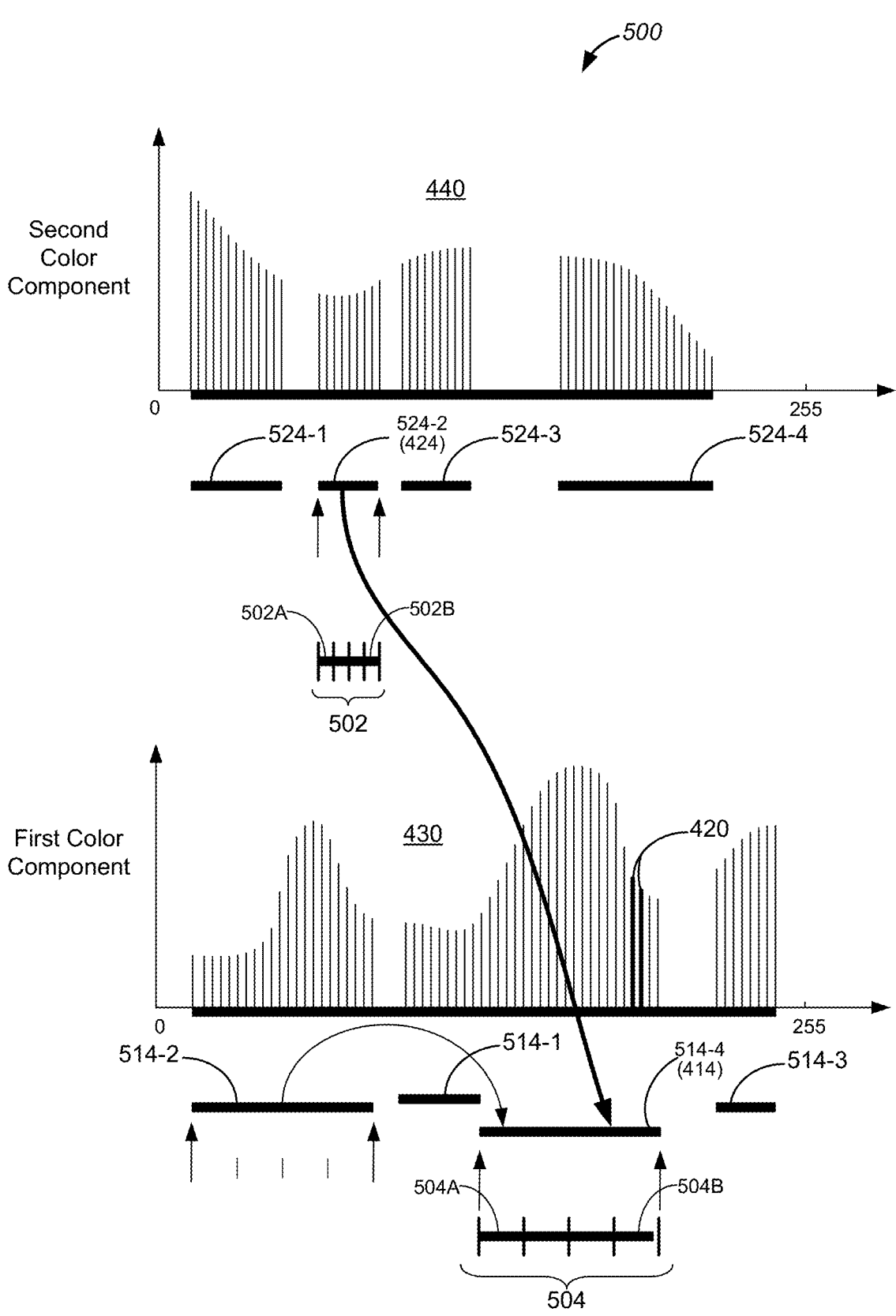
FIG. 5 illustrates another example process of clipping two color components of a current coding block 404 of a current image frame, in accordance with some embodiments.

FIG. 5 illustrates another example process 500 of clipping two color components of a current coding block 404 of a current image frame 402, in accordance with some embodiments. A sequence of image frames of a GOP includes the current image frame 402 that further includes the current coding block 404. In some embodiments, the decoder 122 obtains video data of the current image frame 402 including a sample 410 with a first color component 412 (e.g., blue color component) and a second color component 422 (e.g., red color component). A first clipping range 414 is determined for pixel values of the first color component 412 and used to determine a second clipping range 424 for the sample 410. The decoder 122 reconstructs the current image frame 402, including clipping the pixel values of the second color component 422 according to the second clipping range. Each of the color components 412 and 422 of the current image frame 402 is represented by a respective color plot 430 or 440 illustrating a relationship of a time of occurrence of each pixel value and a pixel value (e.g., in a range of 0-255). The first and second clipping ranges 414 and 424 correspond to a range of pixel values of the color components 412 and 422 on x-axes of the color plots 430 and 440.

In some embodiments, the second clipping range 424 is selected from a plurality of second non-contiguous data ranges 524. Based on the first clipping range 414 for pixel values of the first color component 412, the decoder selects the second clipping range 424 corresponding to the sample 410 from the plurality of second non-contiguous data ranges 524. Further, in some embodiments, each second non-contiguous data range 524 (e.g., uniquely) corresponds to a first data range 514 of the first color component 412. The decoder 122 compares the pixel value of the first color component 412 of the sample 410 to the first data range 514 corresponding to each of a subset (e.g., all, less than all) of second non-contiguous data ranges 524. In accordance with a comparison result, the first clipping range 414 is identified from first data ranges 514 corresponding to the subset of second non-contiguous data ranges 524. The second clipping range 424 corresponds to the identified first clipping range 414. Referring to FIG. 5, in an example, the second non-contiguous data ranges 524-1, 524-2, 524-3, and 524-4 correspond to the first data ranges 514-1, 514-2, 514-3, and 514-4, respectively. The pixel value of the first color component 412 of the sample 410 is compared with a subset or all of the first data ranges 514-1, 514-2, 514-3, and 514-4 to determine that the second clipping range 514C of the second color component 422 includes the first data range 514-4, which corresponds to the second non-contiguous data range 524-2. As such, the second non-contiguous data range 524-2 is selected as the second clipping range 424 of the second color component 412.

In some embodiments, the second clipping range 424 of the second color component 422 includes a plurality of contiguous data intervals 502, and each contiguous data interval 502 (e.g., uniquely) corresponds to a data interval 504 of the first clipping range 414 of the first color component 412. The bitstream transmitted by the encoder 106 to the decoder 122 carries information of the plurality of contiguous data intervals 502, information of the data intervals 504 of the first clipping range 414 corresponding to each of the plurality of contiguous data intervals 502, or both. As explained above, the second clipping range 424 includes the sample 410 of the second color component 422. In some embodiments, a pixel value of the second color component 422 is shifted by an offset to determining an interval index representing one of the plurality of contiguous data intervals 502 in the second clipping range 424. In some embodiments, the plurality of contiguous data intervals 502 includes a first number of data intervals, and the first number is predefined or signaled in a syntax associated with the current image frame 402. Alternatively, in some embodiments, the plurality of contiguous data intervals 502 has a fixed interval size. In some embodiments, each contiguous data interval 502 has a size in a predefined substantially small size range (e.g., between 20-40).

In some embodiments, a pixel value 420 of the first color component 412 is shifted by an offset to determine an interval index representing one of a plurality of data intervals 504 in the first clipping range 414. In some embodiments, the plurality of data intervals 504 includes the second number of data intervals, and the second number is predefined or signaled in a syntax associated with the current image frame 402. Alternatively, in some embodiments, the plurality of data intervals 504 has a fixed interval size. In some embodiments, each data interval 504 has a size in a predefined substantially small size range (e.g., between 20-40). In an example, the pixel value of the sample 410 is shifted by six bits (i.e., divided by 64) to determine an integer value corresponding to the interval index. Every interval has a fixed size of 64. Further, in some embodiments, the interval index used to identify one of the data intervals 504 in the first clipping range 414 is also used to identify one of the data intervals 502 in the second clipping range 424.

In some embodiments, the second clipping range 424 of the first color component includes a plurality of contiguous data intervals 502 further including a first data interval 502A and a second data interval 502B. The first data interval 502A is defined by two interval limits. The second data interval 502B is defined and signaled using deviations from the two interval limits of the first data interval 502A. In some embodiments, the first clipping range 414 of the second color component includes a plurality of data intervals 504 further including a third data interval 504A and a fourth data interval 504B. The third data interval 504A is defined by two interval limits. The fourth data interval 504B is defined and signaled using deviations from the two interval limits of the third data interval 504A.

In some embodiments, a first one of the data ranges 514 is determined based on a second one of the data ranges 514. For example, an upper limit and a lower limit of the data range 514-2 are known, and an upper limit and a lower limit of the data range 514-4 are determined based on deviations from the known upper and lower limits of the data range 514-2. One or two deviations are signaled for the data range 514-4 to determine its upper and lower limit of the data range 514-4 based on the known upper and lower limits of the data range 514-2 during decoding.

Figure 6:
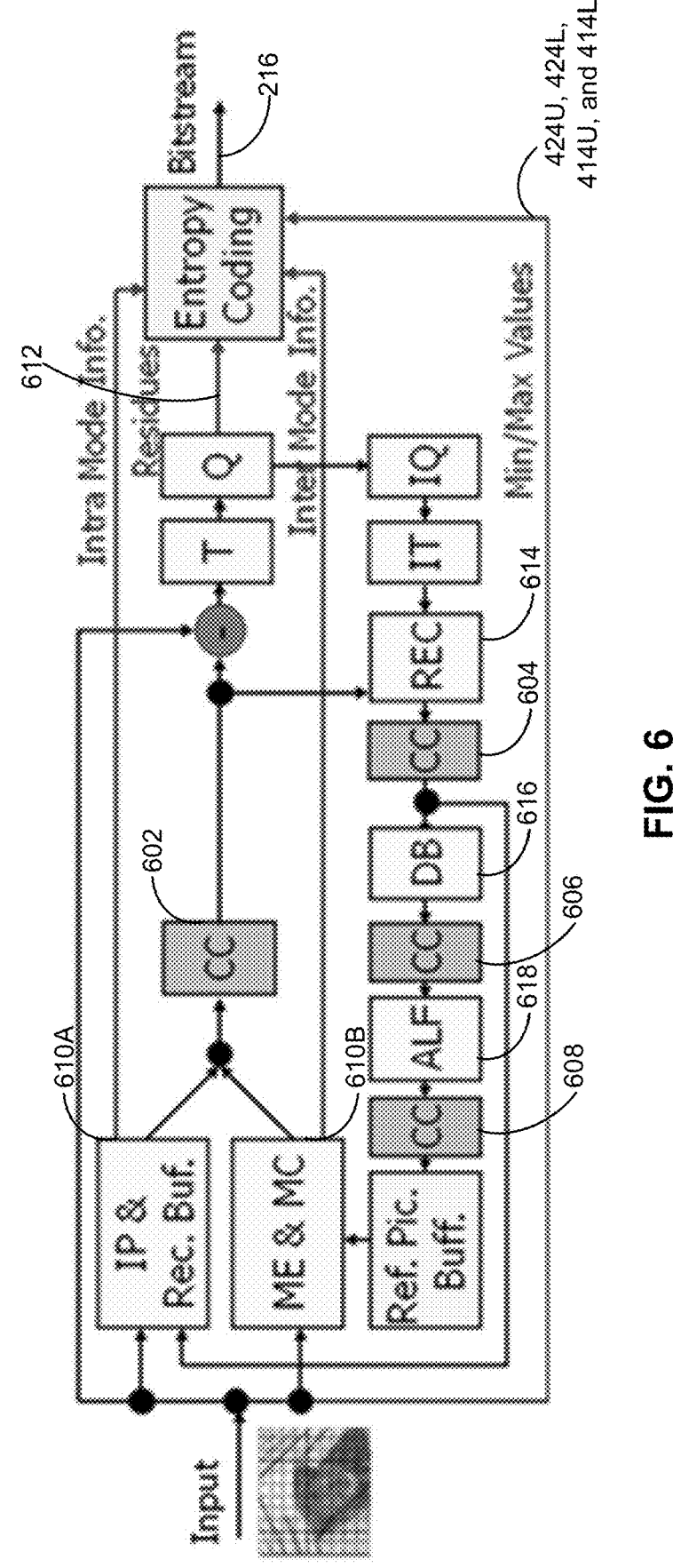
FIG. 6 is a simplified block diagram illustrating example elements of an encoder, in accordance with some embodiments.

FIG. 6 is a simplified block diagram illustrating example elements of an encoder 106 in accordance with some embodiments. For controlled clipping of different color components 422 and 412, information of two clipping ranges 424 and 414 of pixels in a current image frame 102 is encoded in a bitstream 216 (also called a coded video sequence 216), which is transmitted to a decoder 122. For example, the first clipping range 414 is represented by a minimum value 414L (min_value) and a maximum value 414U (max_value) of the first color component 412 of the sample 410 in the current image frame 102. If the pixel value of a first color component 412 is out of the first clipping range 414 after reconstruction (in the encoder 106 or decoder 122), the pixel value of the first color component 412 is clipped to the first clipping range 414 based on the minimum or maximum value 414L or 414U of the first clipping range 414. The second clipping range 424 and first clipping range 414 are predicted during encoding and before transmission. In some embodiments, controlled clipping is implemented as a Clip3 function shown as the following equation:

$$\text{clipped\_value}=\text{Clip3}(\text{min\_value},\text{max\_value}, \text{orig\_value}); \qquad (1)$$

where orig_value and clipped_value represent an original value and a clipped_value of a color sample, respectively. The Clip3 function restricts the original value and the clipped_value in a clipping range 424 or 414 of [min_value, max_value].

In some embodiments, controlled clipping is applied during a plurality of encoding stages of the encoder 106 (e.g., four encoding stages) and a plurality of decoding stages of the decoder 122 (e.g., four decoding stages). For example, four encoding stages are post-prediction clipping 602, post-reconstruction clipping 604, post-deblocking clipping 606, and post-adaptive loop filtering (ALF) clipping 608. Prediction reference buffers 610A and 610B of both intra prediction and inter prediction are used to store predicted values and generate residuals 612 against an original sequence of images, and post-prediction clipping 602 is applied to reduce an error level of the residuals 612. Before reconstruction, the residuals 612 are quantized for transmission. The residuals 612 are inverse quantized during reconstruction 614, which expands a dynamic range of the residuals 612, and it also changes the dynamic range of the reconstructed pixel values. If the range is known in advance, the dynamic range of the reconstructed pixel values can be restricted by post-reconstruction clipping 604. The pixel error is reduced while the reconstructed pixel value exceeds the restricted range. Deblocking 616 and ALF 618 change the reconstructed pixel values by filtering, and optionally change a dynamic range of the pixel values. Post-deblocking clipping 606 and post-ALF clipping 608 are applied to restrict the pixel values in the clipping ranges 414 and 424.

The controlled clipping minimum values 414L and 424L and maximum values 414U and 424U are defined at picture parameter set (PPS) level or slice level. In some embodiments, PPS-level adaptation is used, and the minimum and maximum values are sent in PPS or predefined by setting a broadcast legal flag to 1. In some embodiments, slice-level adaptation is enabled for luma and chroma components separately. The minimum and maximum values conveyed in PPS are used for prediction of those in slice header.

In some embodiments, during encoding or decoding, the data of the current image frame 402 includes one or more of: a coding block of prediction samples, a coding block of reconstructed samples, and one or more reconstructed coding blocks that are processed and outputted by a loop filter. The loop filter is selected from a group consisting of a deblocking filter, a CDEF filter, a CCSO filter, a loop restoration filter, an SAO filter, an adaptive loop filter, a cross-component ALF, and a cross-component SAO filter.

FIG. 7 is a flow diagram illustrating a method 700 of coding video, in accordance with some embodiments. The method 700 may be performed at a computing system (e.g., the server system 112, the source device 102, or the electronic device 120) having control circuitry and memory storing instructions for execution by the control circuitry. In some embodiments, the method 700 is performed by executing instructions stored in the memory (e.g., the coding module 320 of the memory 314) of the computing system. A clipping operation is applied to a pixel value 410 of a second color component 422 using a pixel value 420 of a first color component 412. In some embodiments, each of the second color component 422 and the first color component 412 corresponds to a distinct color component of red, green, and blue primary colors. Alternatively, in some embodiments, the second color component 422 is one of two chroma components (Cb and Cr), and the first color component 412 is a luma component corresponding to the one of the two chroma components. The clipping operation is based on one or more clipping parameters (e.g., a minimum value or a maximum value of a clipping range of a first or second color component), which are identified on a data level corresponding to one of VPS, SPS, PPS, APS, slice header, picture header, tile header, CTU header. In some embodiments, a block is one of a coding block, a prediction block, and a transform block.

In some embodiments, a plurality of clipping ranges (e.g., first non-contiguous data ranges 512 in FIG. 5) are signaled for a second color component 422, and the selection of a second clipping range 424 depends on the pixel value of another one or more color components (e.g., a first color component 412). In an example, a clipping range of a second color component (e.g., Y component) is split as a plurality of data intervals 504. For each data interval 502, a corresponding data interval 502 of the second clipping range 424 is signaled for the first color component (e.g., Cb or Cr component). In another example, an interval index identifying the corresponding data interval in a second clipping range 424 or a first clipping range 414 is determined by a pixel value shifted by an offset. In some embodiments, the number of intervals is pre-defined or signaled in in a high-level syntax, which refers to any data level above a block level and optionally is one of VPS, SPS, PPS, APS, slice header, picture header, tile header, CTU header. In some situations, a block refers to a coding block, prediction block, transform block. In some embodiments, the data intervals 502 have equal size. In some embodiments, the data intervals 504 have equal size. In some embodiments, the data intervals 502 have sizes that are controlled within a substantially small range (e.g., within pixel values of ±20). In some embodiments, the data intervals 504 have sizes that are controlled within a substantially small range (e.g., within pixel values of ±10).

In some embodiments, the pixel values 420 of the first color component 412 are co-located with the sample 410 of the second color component 422. In some embodiments, downsampling is first applied to the first color component 412, then the downsampled sample 420, which is collocated with the sample 410 of the second color component 422, is used to identify the second clipping range 424 for the sample 410 of the second color component 422. Alternatively, in some embodiments, when applying sample clipping on the second color component 422, the reconstructed pixel value of the first color component 412 is examined, and a clipping range index is determined for the first color component 412. Based on the clipping range index, a clipping range or index is selected for performing the sample clipping on the second color component 422.

In some embodiments, when applying sample clipping on a second color component 422 (e.g., Cb or Cr), the already determined clipping range 414 of a first color component 412 (e.g., Y) is used. A delta value $d_1$ or $d_2$ is signaled for each of a lower limit 424L (min) and an upper limit 424U (max) of the second clipping range 424. In some embodiments, the delta value $d_1$ or $d_2$ is signaled directly. In some situations, the second clipping range 424 of the second color component 422 (e.g., Cb) is determined based on the first clipping range 414 of the first color component 412 (e.g., Y). The second clipping range 424 is represented based on a second upper limit 424U (e.g., max_Cb) and a second lower limit 424L (e.g., min_Cb), and the first clipping range 414 is represented based on a first upper limit 414U (e.g., max_Y) and a first lower limit 414L (e.g., min_Y). The limits 424U and 424L are represented based on a first deviation $d_1$ (delta_max_Y_Cb) and a second deviation $d_2$ (delta_min_Y_Cb) as follows:

$$min\_Cb = min\_Y + delta\_min\_Y\_Cb; \text{ and} \tag{2}$$

$$max\_Cb = max\_Y - delta\_max\_Y\_Cb. \tag{3}$$

In some situations, the first deviation $d_1$ (delta_max_Y_Cb) and the second deviation $d_2$ (delta_min_Y_Cb) are signaled in a quantized form of 2 to the power of N (or bit shifting of N). The limits 424U and 424L of the second clipping range 424 are represented as follows:

$$min\_Cb = min\_Y + (1 << delta\_min\_Y\_Cb\_shift); \text{ and} \tag{4}$$

$$max\_Cb = max\_Y - (1 << delta\_max\_Y\_Cb\_shift). \tag{5}$$

In some embodiments, when applying sample clipping on a second color component 422 (e.g., Cb or Cr) for a pixel value 420 of a first color component 412. The already determined first clipping range 414 for a second pixel value 420 of the first color component 412 is applied to determine the first clipping range of the second color component 422. A first deviation $d_1$ is signaled for the second upper limit 424U of the second clipping range 424, and a second deviation $d_2$ is signaled for the second lower limit 424L of the second clipping range 424.

In some embodiments, sample clipping may be applied on prediction samples, reconstructed samples after adding residual and prediction samples, and reconstructed samples after applying certain loop filtering. In an example, loop filtering includes, but not limited to, a subset of deblocking, constrained directional enhancement filtering (CDEF) as in AV1, cross-component sample offsetting (CCSO) as in AVM (AOMedia Video Model), loop restoration in AV1, sample adaptive offset (SAO) filtering, adaptive loop filtering, cross-component ALF, and cross-component SAO.

In some embodiments, dynamic ranges of a plurality of color components are associated and coded with a first image region of the current image frame 402. The first image region is optionally an entire picture, an image slice, or a given partition of the current image frame 402. The clipping ranges of the plurality of color components of the first image region are used as predictor when performing range clipping for a second image region that is encoded and decoded after the first image region. In an example, a current image frame has a second clipping range 424 of the second color component 422 and a first clipping range 414 of the first color component 412. For sample clipping, the second upper limit 424U (max_Cb) and the second lower limit 424L (min_Cb) are determined based on the first deviation $d_1$ (delta_max_Y_Cb) and the second deviation $d_2$ (delta_min_Y_Cb) as follows:

$$\min\_Cb = \min\_Y + \text{delta\_min\_Y\_Cb}; \text{ and} \quad (6)$$

$$\max\_Cb = \max\_Y - \text{delta\_max\_Y\_Cb}. \quad (7)$$

In some situations, the first deviation $d_1$ (delta_max_Y_Cb) and the second deviation $d_2$ (delta_min_Y_Cb) are predicted or derived based on the range information of a previously coded picture (e.g., a prior image frame 428 in FIG. 4). In on example, a first deviation $d_1$ (delta_max_Y_Cb) and the second deviation $d_2$ (delta_min_Y_Cb) remain unchanged between the prior image frame 428 and the current image frame 402. The second clipping range 424 of the second color component 422 of the image frame 428 has the second upper limit 424U (max_Cb') and the second lower limit 424L (min_Cb'), and the first clipping range 414' of the first color component 412 of the reference image 406 has the first upper limit 414U (max_Y') and the first lower limit 414L (min_Y'). The first deviation $d_1$ (delta_max_Y_Cb) and the second deviation $d_2$ (delta_min_Y_Cb) of the current image frame 402 are determined as follows:

$$\text{delta\_min\_Y\_Cb} = \min\_Cb' - \min\_Y; \text{ and} \quad (8)$$

$$\text{delta\_max\_Y\_Cb} = \max\_Y' - \max\_Cb' \quad (9)$$

In some embodiments, different clipping ranges are applied based on whether a luma mapping with chroma scaling (LMCS) filter is applied for current block. The LMCS filter is added as a new processing block between reconstruction 614 and loop filtering 616-618 (FIG. 6). LMCS has two main components: 1) in-loop mapping of the luma component based on adaptive piecewise linear models; and 2) for the chroma components, luma-dependent chroma residual scaling is applied. In some embodiments, the LMCS filter is applied. The second clipping range 424 or the first clipping range 414 is determined by a bit depth applied for encoding and decoding. Alternatively, in some embodiments, the LMCS filter is not applied, the second clipping range 424 of the second color component 422 or the first clipping range 414 of the first color component 412 is determined based on a predefined clipping range 418 having a predefined upper limit 418U (max_Y_0) and a predefined lower limit 418L (min_Y_0). For the first clipping range 414, an upper deviation $d_U$ (max_Y_slice_delta) and a lower deviation $d_D$ (min_Y_slice_delta) are optionally signaled in a quantized form of 2 to the power of N (or bit shifting of N) to save on a bitrate. In an example, the first color component 412 corresponds to a luma component (Y). A slice-level first clipping range 414 is determined as follows.

$$\min\_Y\_slice = \min\_Y\_0 + (1 << \min\_Y\_slice\_delta \text{ shift}); \text{ and} \quad (10)$$

$$\max\_Y\_slice = \max\_Y\_0 - \max\_Y\_slice\_delta \text{ shift}. \quad (11)$$

Although FIG. 7 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method 700 for coding video data. The method 700 includes receiving (702) video data including a current non-monochrome image frame with two or more color components. The current non-monochrome image frame includes (704) a sample with a first color component and a second color component, where the second color component is different from the first color component. The method 700 further includes obtaining (706) a first clipping range for pixel values of the first color component in the sample based on a syntax element value in the received video data; deriving (708) a second clipping range for pixel values of the second color component in the sample based on the first clipping range for pixel values of the first color component; in response to a pixel value of the second color component exceeding the second clipping range, restricting (710) the pixel value to a minimum value or a maximum value corresponding to the second clipping range; and reconstructing (712) the current non-monochrome image frame using the restricted pixel value for the sample.

(A2) In some embodiments of A1, the second clipping range is selected from a plurality of second non-contiguous data ranges of the second color component. Deriving the second clipping range further includes, based on the first clipping range for the pixel values of the first color component, selecting the second clipping range corresponding to the second color component from the plurality of second non-contiguous data ranges.

(A3) In some embodiments of A1 or A2, each second non-contiguous data range corresponds to a first data range of the first color component. Selecting the second clipping range further includes: comparing the pixel value of the first color component to the first data range corresponding to each of a subset of second non-contiguous data ranges; and in accordance with a comparison result, identifying the first clipping range from first data ranges corresponding to the subset of second non-contiguous data ranges. The second clipping range corresponds to the first clipping range.

(A4) In some embodiments of any of A1-A3, the second clipping range is defined by a second upper limit corresponding to the maximum value and a second lower limit corresponding to the minimum value. The first clipping range is defined by a first upper limit differing from the second upper limit by a first deviation and a first lower limit differing from the second lower limit by a second deviation. Determining the second clipping range further includes (1) determining the second upper limit based on the first upper limit and the first deviation and (2) determining the second lower limit based on the first lower limit and the second deviation.

(A5) In some embodiments of A4, wherein each of the first deviation and the second deviation is represented and signaled in a quantized form of 2 to a power of a respective integer number.

(A6) In some embodiments of A4, the current non-monochrome image frame follows a prior image in a group of pictures (GOP). The prior image includes a prior sample having the first color component and the second color component. Pixel values of the first color component of the prior sample correspond to a third clipping range defined by a third upper limit and a third lower limit, and pixel values of the second color component of the prior sample corresponds to a fourth clipping range defined by a fourth upper limit differing from the third upper limit by a third deviation and a fourth lower limit differing from the third lower limit by a fourth deviation. Obtaining the video data of the current non-monochrome image frame further includes determining the first deviation between the first and second upper limits based on the third deviation and determining the second deviation between the first and second lower limits based on the fourth deviation.

(A7) In some embodiments of any of A1-A6, the second clipping range for the pixel values of the second color component includes a plurality of contiguous data intervals, and each contiguous data interval corresponds to a data interval of the first clipping range for the pixel values of the first color component. The method 700 further includes obtaining a bitstream including information of the plurality of contiguous data intervals and information of the data interval of the first clipping range corresponding to each of the plurality of contiguous data intervals.

(A8) In some embodiments of any of A7, the second clipping range includes a pixel value of the first color component of the sample. The method 700 further includes shifting the pixel value of the first color component of the sample by an offset to determine an interval index representing one of the plurality of contiguous data intervals in the second clipping range.

(A9) In some embodiments of A7 or A8, the plurality of contiguous data intervals includes a first number of data intervals, and the first number is predefined or signaled in a syntax associated with the current non-monochrome image frame.

(A10) In some embodiments of any of A7-A9, the plurality of contiguous data intervals has a fixed interval size.

(A11) In some embodiments of any of A1-A10, the second clipping range of the second color component includes a plurality of contiguous data intervals further including a first data interval and a second data interval. The first data interval is defined by two interval limits. The second data interval is defined and signaled using deviations from the two interval limits of the first data interval.

(A12) In some embodiments of any of A1-A11, the second color component is co-located with the first color component in the current non-monochrome image frame.

(A13) In some embodiments of any of A1-A12, the method 700 further includes obtaining information of the first clipping range for the pixel values of the first color component in a high level syntax associated with the current non-monochrome image frame, wherein the high level syntax corresponds to a data level above a block level, and is embedded in one of a group consisting of VPS, SPS, PPS, APS, slice header, picture header, tile header, CTU header.

(A14) In some embodiments of any of A1-A13, the video data including the current non-monochrome image frame includes (720) one or more of: a coding block of prediction samples, a coding block of reconstructed samples, and one or more reconstructed coding blocks that are processed and outputted by a loop filter.

(A15) In some embodiments of A14, the loop filter is selected from a group consisting of a deblocking filter, a CDEF filter, a CCSO filter, a loop restoration filter, an SAO filter, an adaptive loop filter, a cross-component ALF, and a cross-component SAO filter.

(A16) In some embodiments of any of A1-A15, the method 700 further includes determining whether a luma mapping with chroma scaling (LMCS) filter is applied and in accordance with a determination that the LMCS filter is applied, determining the second clipping range based on a bit depth of video coding.

(A17) In some embodiments of any of A1-A16, the method 700 further includes determining that an LMCS filter is not applied. The first clipping range is defined by a first upper limit differing from a predefined upper limit by an upper deviation and a first lower limit differing from a predefined lower limit by a lower deviation. Obtaining the video data including the current non-monochrome image frame further includes obtaining the upper deviation and the lower deviation. Obtaining the first clipping range further includes determining the first clipping range based on the upper deviation and the lower deviation.

(A18) In some embodiments of any of A1-A17, the first color component is a luma component corresponding to the one of the two chroma components, and the second color component is one of two chroma components (Cb and Cr).

(A19) In some embodiments of any of A1-A17, the first color component includes a first one of red, green, and blue primary colors, and the second color component includes a second one of the red, green, and blue primary colors.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A21 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A21 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
receiving a video bitstream including a current non-monochrome image frame with two or more color components, the current non-monochrome image frame including a sample with a first color component and a second color component, wherein the second color component is different from the first color component;
obtaining, based on a syntax element in the video bitstream, a first clipping range for pixel values of the first color component in the sample based on a syntax element value in the received video data;
deriving a second clipping range for pixel values of the second color component in the sample based on the first clipping range, wherein the second clipping range for the pixel values of the second color component includes a plurality of contiguous data intervals, and each contiguous data interval corresponds to a data interval of the first clipping range for the pixel values of the first color component, and wherein the video bitstream includes information of the plurality of contiguous data intervals and information of the data interval of the first clipping range corresponding to each of the plurality of contiguous data intervals;
when a pixel value of the second color component exceeds the second clipping range, restricting the pixel value to a minimum value or a maximum value corresponding to the second clipping range; and
reconstructing the current non-monochrome image frame using the restricted pixel value for the sample.

2. The method of claim 1, wherein:
the second clipping range is defined by a second upper limit corresponding to the maximum value and a second lower limit corresponding to the minimum value;
the first clipping range is defined by a first upper limit differing from the second upper limit by a first deviation and a first lower limit differing from the second lower limit by a second deviation; and
determining the second clipping range further includes (1) determining the second upper limit based on the first upper limit and the first deviation and (2) determining the second lower limit based on the first lower limit and the second deviation.

3. The method of claim 2, wherein each of the first deviation and the second deviation is represented and signaled in a quantized form of 2 to a power of a respective integer number.

4. The method of claim 2, wherein:
the current non-monochrome image frame follows a prior image in a group of pictures (GOP);
the prior image includes a prior sample having the first color component and the second color component;
pixel values of the first color component of the prior sample correspond to a third clipping range defined by a third upper limit and a third lower limit, and pixel values of the second color component of the prior sample corresponds to a fourth clipping range defined by a fourth upper limit differing from the third upper limit by a third deviation and a fourth lower limit differing from the third lower limit by a fourth deviation; and
obtaining the video data of the current non-monochrome image frame further comprises:
determining the first deviation between the first and second upper limits based on the third deviation; and
determining the second deviation between the first and second lower limits based on the fourth deviation.

5. The method of claim 1, the second clipping range including a pixel value of the first color component of the sample, the method further comprising: shifting the pixel value of the first color component of the sample by an offset to determine an interval index representing one of the plurality of contiguous data intervals in the second clipping range.

6. The method of claim 1, wherein the plurality of contiguous data intervals includes a first number of data intervals, and the first number is predefined or signaled in a syntax associated with the current non-monochrome image frame.

7. The method of claim 1, wherein the plurality of contiguous data intervals has a fixed interval size.

8. The method of claim 1, wherein the video bitstream including the current non-monochrome image frame includes one or more of: a coding block of prediction samples, a coding block of reconstructed samples, and one or more reconstructed coding blocks that are processed and outputted by a loop filter.

9. The method of claim 8, wherein the loop filter is selected from a group consisting of: a deblocking filter, a constrained directional enhancement filter (CDEF) filter, a cross-component sample offset (CCSO) filter, a loop restoration filter, an SAO filter, an adaptive loop filter, a cross-component adaptive loop filter (ALF), and a sample adaptive offset (SAO) filter.

10. A computing system, comprising:
control circuitry; and
memory storing one or more programs configured to be executed by the control circuitry, the one or more programs further comprising instructions for:
receiving video data including a current non-monochrome image frame with two or more color components, the current non-monochrome image frame including a sample with a first color component and a second color component, wherein the second color component is different from the first color component;
deriving a first clipping range for pixel values of the first color component in the sample;
deriving a second clipping range for pixel values of the second color component in the sample based on the first clipping range, wherein the second clipping range for the pixel values of the second color component includes a plurality of contiguous data intervals, and each contiguous data interval corresponds to a data interval of the first clipping range for the pixel values of the first color component;

signaling, in a video bitstream, information of the plurality of contiguous data intervals and information of the data interval of the first clipping range corresponding to each of the plurality of contiguous data intervals;

when a pixel value of the second color component exceeds the second clipping range, restricting the pixel value to a minimum value or a maximum value corresponding to the second clipping range; and encoding the current non-monochrome image frame using the restricted pixel value for the sample.

11. The computing system of claim 10, wherein:

the plurality of contiguous data intervals includes a first data interval and a second data interval;

the first data interval is defined by two interval limits; and the second data interval is defined and signaled using deviations from the two interval limits of the first data interval.

12. The computing system of claim 10, wherein the second color component is co-located with the first color component in the current non-monochrome image frame.

13. The computing system of claim 10, the one or more programs further comprising instructions for:

signaling information of the first clipping range for the pixel values of the first color component in a high level syntax associated with the current non-monochrome image frame.

14. The computing system of claim 10, wherein:

the second clipping range is defined by a second upper limit corresponding to the maximum value and a second lower limit corresponding to the minimum value;

the first clipping range is defined by a first upper limit differing from the second upper limit by a first deviation and a first lower limit differing from the second lower limit by a second deviation; and determining the second clipping range further includes (1) determining the second upper limit based on the first upper limit and the first deviation and (2) determining the second lower limit based on the first lower limit and the second deviation.

15. The computing system of claim 14, wherein each of the first deviation and the second deviation is represented and signaled in a quantized form of 2 to a power of a respective integer number.

16. The computing system of claim 10, wherein the plurality of contiguous data intervals has a fixed interval size.

17. A method of obtaining a video bitstream, the video bitstream comprising:

coded data video information for a current non-monochrome image frame with two or more color components, the current non-monochrome image frame including a sample with a first color component and a second color component, wherein the second color component is different from the first color component; and information of a plurality of contiguous data intervals for a second clipping range and information of a data interval of a first clipping range corresponding to each of the plurality of contiguous data intervals;

the method comprising:

deriving the first clipping range for pixel values of the first color component in the sample;

deriving the second clipping range for pixel values of the second color component in the sample based on the first clipping range, wherein the second clipping range for the pixel values of the second color component includes the plurality of contiguous data intervals;

signaling, in the video bitstream, information of the plurality of contiguous data intervals and information of the data interval of the first clipping range corresponding to each of the plurality of contiguous data intervals;

when a pixel value of the second color component exceeds the second clipping range, restricting the pixel value to a minimum value or a maximum value corresponding to the second clipping range; and encoding the current non-monochrome image frame using the restricted pixel value for the sample.

18. The method of claim 17, wherein:

the second clipping range is defined by a second upper limit corresponding to the maximum value and a second lower limit corresponding to the minimum value;

the first clipping range is defined by a first upper limit differing from the second upper limit by a first deviation and a first lower limit differing from the second lower limit by a second deviation; and determining the second clipping range further includes (1) determining the second upper limit based on the first upper limit and the first deviation and (2) determining the second lower limit based on the first lower limit and the second deviation.

19. The method of claim 18, wherein each of the first deviation and the second deviation is represented and signaled in a quantized form of 2 to a power of a respective integer number.

20. The method of claim 17, wherein the plurality of contiguous data intervals has a fixed interval size.

* * * * *